(12) United States Patent
Moriya et al.

(10) Patent No.: US 10,714,266 B2
(45) Date of Patent: Jul. 14, 2020

(54) ELECTRONIC COMPONENT AND METHOD OF MANUFACTURING THE SAME

(71) Applicant: Taiyo Yuden Co., Ltd., Tokyo (JP)

(72) Inventors: Takuya Moriya, Tokyo (JP); Tsuyoshi Ogino, Tokyo (JP); Koji Otsuka, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/546,855

(22) Filed: Aug. 21, 2019

(65) Prior Publication Data

US 2019/0378659 A1 Dec. 12, 2019

Related U.S. Application Data

(63) Continuation of application No. 15/412,587, filed on Jan. 23, 2017, now Pat. No. 10,431,387.

(30) Foreign Application Priority Data

Mar. 18, 2016 (JP) .................................. 2016-054661

(51) Int. Cl.
*H01F 5/00* (2006.01)
*H01G 4/40* (2006.01)
(Continued)

(52) U.S. Cl.
CPC ................. *H01G 4/40* (2013.01); *H01F 5/00* (2013.01); *H01F 5/003* (2013.01);
(Continued)

(58) Field of Classification Search
CPC .............................. H01F 27/00–36; H01F 5/00
(Continued)

(56) References Cited

U.S. PATENT DOCUMENTS 7,696,849 B2  4/2010  Ito
8,050,045 B2  11/2011 Okuzawa
(Continued)

FOREIGN PATENT DOCUMENTS

CN    1448966    10/2003
CN    1929050     3/2007
(Continued)

OTHER PUBLICATIONS

Non-final Office Action U.S. Appl. No. 15/412,587 dated Jan. 2, 2019.

(Continued)

*Primary Examiner* — Tuyen T Nguyen
(74) *Attorney, Agent, or Firm* — Pillsbury Winthrop Shaw Pittman, LLP

(57) ABSTRACT

An electronic component according one embodiment of the disclosure includes an insulator, an internal conductor, and an external electrode. The insulator is made of a material containing resin. The insulator includes a first insulating layer that has a first bonding surface perpendicular to one axial direction and a second insulating layer bonded to the first bonding surface. The internal conductor includes a plurality of first via conductive members provided in the first insulating layer and a plurality of second via conductive members provided in the second insulating layer. Each of the first via conductive members has a first contact connected to the corresponding second via conductive member at a position offset in the one axial direction with respect to the first bonding surface.

15 Claims, 19 Drawing Sheets

(51) Int. Cl.
  *H01F 17/00* (2006.01)
  *H01F 27/29* (2006.01)
  *H01F 41/04* (2006.01)
  *H01G 4/005* (2006.01)
  *H01G 4/012* (2006.01)

(52) U.S. Cl.
  CPC ....... *H01F 17/0013* (2013.01); *H01F 27/292* (2013.01); *H01F 41/041* (2013.01); *H01G 4/005* (2013.01); *H01F 2017/0026* (2013.01); *H01G 4/012* (2013.01)

(58) Field of Classification Search
  USPC ............ 336/65, 83, 192, 200, 206–208, 232
  See application file for complete search history.

(56) References Cited

U.S. PATENT DOCUMENTS

| | | | | |
|---|---|---|---|---|
| 2003/0183165 A1* | 10/2003 | Kakimoto | ......... | H01L 21/67092 118/35 |
| 2007/0040163 A1 | 2/2007 | Okuzawa et al. | | |
| 2014/0292466 A1 | 10/2014 | Watanabe et al. | | |

FOREIGN PATENT DOCUMENTS

| | | |
|---|---|---|
| CN | 102760553 | 10/2012 |
| CN | 202513015 | 10/2012 |
| CN | 104603889 | 5/2015 |
| JP | 2000-150514 | 5/2000 |
| JP | 2006-324489 | 11/2006 |
| JP | 2011-129575 | 6/2011 |
| JP | 2014-232815 | 12/2014 |
| JP | 2014232815 A * | 12/2014 |
| TW | 201503180 | 1/2015 |

OTHER PUBLICATIONS

Non-final Office Action Korean Patent Application No. 10-2017-0027675 dated Dec. 18, 2017.
First Office Action Chinese Patent Application No. 201710161546.9 dated Apr. 3, 2018.
Notice of Allowance U.S. Appl. No. 15/412,587 dated May 21, 2019.
Non-final Office Action dated Nov. 14, 2018 issued in corresponding Taiwanese Patent Application No. 1017118354.
Notification of Reasons for Refusal dated Sep. 4, 2018 issued in corresponding Japanese Patent Application No. 2016-054661 with English translation.
Second Office Action dated Jan. 3, 2019 issued in corresponding Chinese Patent Application No. 201710161546.9.

* cited by examiner

ELECTRONIC COMPONENT AND METHOD OF MANUFACTURING THE SAME

CROSS-REFERENCE TO RELATED APPLICATIONS

This application is a continuation of U.S. patent application Ser. No. 15/412,587 (filed on Jan. 23, 2017), which claims the benefit of priority from Japanese Patent Application Serial No. 2016-054661 (filed on Mar. 18, 2016), the contents of which are hereby incorporated by reference in its entirety.

TECHNICAL FIELD

The present disclosure relates to an electronic component such as a coil and a method of manufacturing the same.

BACKGROUND

Many electronic apparatus typically include coil components. Especially for mobile devices, coil components may have a chip form and may be surface-mounted on a circuit substrate included in the mobile devices. As an example of the prior art, Japanese Patent Application Publication No. 2006-324489 disclosed a chip coil including a helical conductor that is embedded in a hardened insulating resin and at least whose one end is coupled to an external electrode. The helical direction of the conductor is arranged in parallel with the surface of a substrate on which the coil is mounted.

As another example, Japanese Patent Application Publication No. 2014-232815 disclosed a coil component including a resin insulator, a coil-shaped inner conductor provided inside the insulator, and an external electrode electrically coupled to the internal conductor. The insulator is made in a cuboid shape with the length L, the width W, and the height H, where $L>W \geq H$. The external electrode includes a conductor provided at each end of a plane perpendicular to the height H direction of the insulator as viewed in the length L direction. The internal conductor has a coil axis that is parallel with the width W direction of the insulator.

In the above-mentioned prior arts, insulators and conductors are alternately layered in the height direction using a photolithography and/or plating technique in order to obtain the coil component.

In recent years, miniaturization of components advances and so too with conductors and their sectional areas included in the components. As to electronic components in which insulator is made of resin, effects of stress applied from the resin to conductor cannot be ignored. For example, when an insulator and a conductor are formed of layers, a contraction stress caused by a hardening process of the insulator may act on a bonded portion between an upper conductive layer and a lower conductive layer, which may result in damage of the conductor. For this reason, miniaturization of conductors has been difficult.

SUMMARY

In view of the above, one object of the disclosure is to provide an electronic component in which damage of a conductor due to a stress caused by an insulator can be prevented and to provide a method of manufacturing the same.

An electronic component according one embodiment of the disclosure includes an insulator, an internal conductor, and an external electrode. The insulator is made of a material containing resin. The insulator includes a first insulating layer that has a first bonding surface perpendicular to one axial direction and a second insulating layer bonded to the first bonding surface. The internal conductor includes a plurality of first via conductive members provided in the first insulating layer and a plurality of second via conductive members provided in the second insulating layer. Each of the first via conductive members has a first contact connected to the corresponding second via conductive member at a position offset in the one axial direction with respect to the first bonding surface. The external electrode is disposed on the insulator and electrically coupled to the internal conductor.

In the electronic component, the first contact does not lie in the same plane as the first bonding surface but is provided at a position offset in the stacking direction of the insulating layers with respect to the first bonding surface. For example, when the second insulating layer is formed after the formation of the first insulating layer, by providing the first contact in the first insulating layer, a damage of the first contact due to a stress generated at the time of fabrication of the second insulating layer can be reduced and consequently the first and second via conductive members are stably connected. This makes it possible to achieve the miniaturization of the internal conductor while preventing breakage of the internal conductor due to the stress applied by the insulator.

The insulator may further include a third insulating layer that has a second bonding surface bonded to the second insulating layer. In this case, the internal conductor further include a plurality of third conductive members provided in the third insulating layer. Each of the third via conductive members has a second contact connected to the corresponding second via conductive member at a position offset in the one axial direction with respect to the second bonding surface. In this way, it is possible to realize a contact having a stable multi-layered conductor.

The internal conductor may further include a plurality of first connecting conductive members and a plurality of second connecting conductive members. The plurality of first connecting conductive members are provided in the first insulating layer, and each of the connecting conductive members couples predetermined two first via conductive members among the plurality of first via conductive members. The plurality of second connecting conductive members are provided in the third insulating layer, and each of the second connecting conductive members couples predetermined two third via conductive members among the plurality of third via conductive members. In this case, the plurality of first and second via conductive members and the plurality of first and second connecting conductive members form a coil portion wound around an axis perpendicular to the one axial direction.

The electronic component may further include a capacitor element disposed between the coil portion and the external electrode. The capacitor element includes a first internal electrode layer that is coupled to one end of the coil portion and a second internal electrode layer that is coupled to the other end of the coil portion and faces the first internal electrode layer in the one axial direction. In this way, the electric component that includes both the coil element and the capacitor element can be provided.

The first and second via conductive members and the plurality of first and second connecting conductive members are typically made of a metallic material containing copper, silver or nickel. The first and second contacts are typically formed of a metallic material containing titanium or chromium. The insulator is formed of a material containing resin and ceramic particles.

A method of manufacturing an electronic component according to another embodiment includes forming a first insulating layer on a base plate. A plurality of first via conductive members are formed on the first insulating layer. A second insulating layer that covers the first via conductive members may be subsequently formed on the first insulating layer. The second insulating layer is polished to expose the first via conductive members on a surface of the second insulating layer. The surfaces of the first via conductive members exposed on the second insulating layer are etched. A plurality of second via conductive members are formed on the second insulating layer, and the plurality of second via conductive members being coupled to the plurality of first via conductive members. A third insulating layer that covers the second via conductive members may be subsequently formed on the second insulating layer. An external electrode is formed on the third insulating layer, the external electrode is electrically coupled to the second via conductive members.

The fabrication of the second via conductive members may include forming, on the surface of the second insulating layer, a seed layer that covers the surface of the first via conductive members; forming a resist pattern that has openings at the position corresponding to the surfaces of the first via conductive members; and forming the second via conductive members by electroplating using the resist pattern as a mask.

As described above, according to the invention, it is possible to prevent damage of the conductive members due to a stress of the insulator.

DESCRIPTION OF THE PREFERRED EMBODIMENTS

Embodiments of the disclosure will be described hereinafter with reference to the drawings.

First Embodiment

Basic Structure

Figure 1:
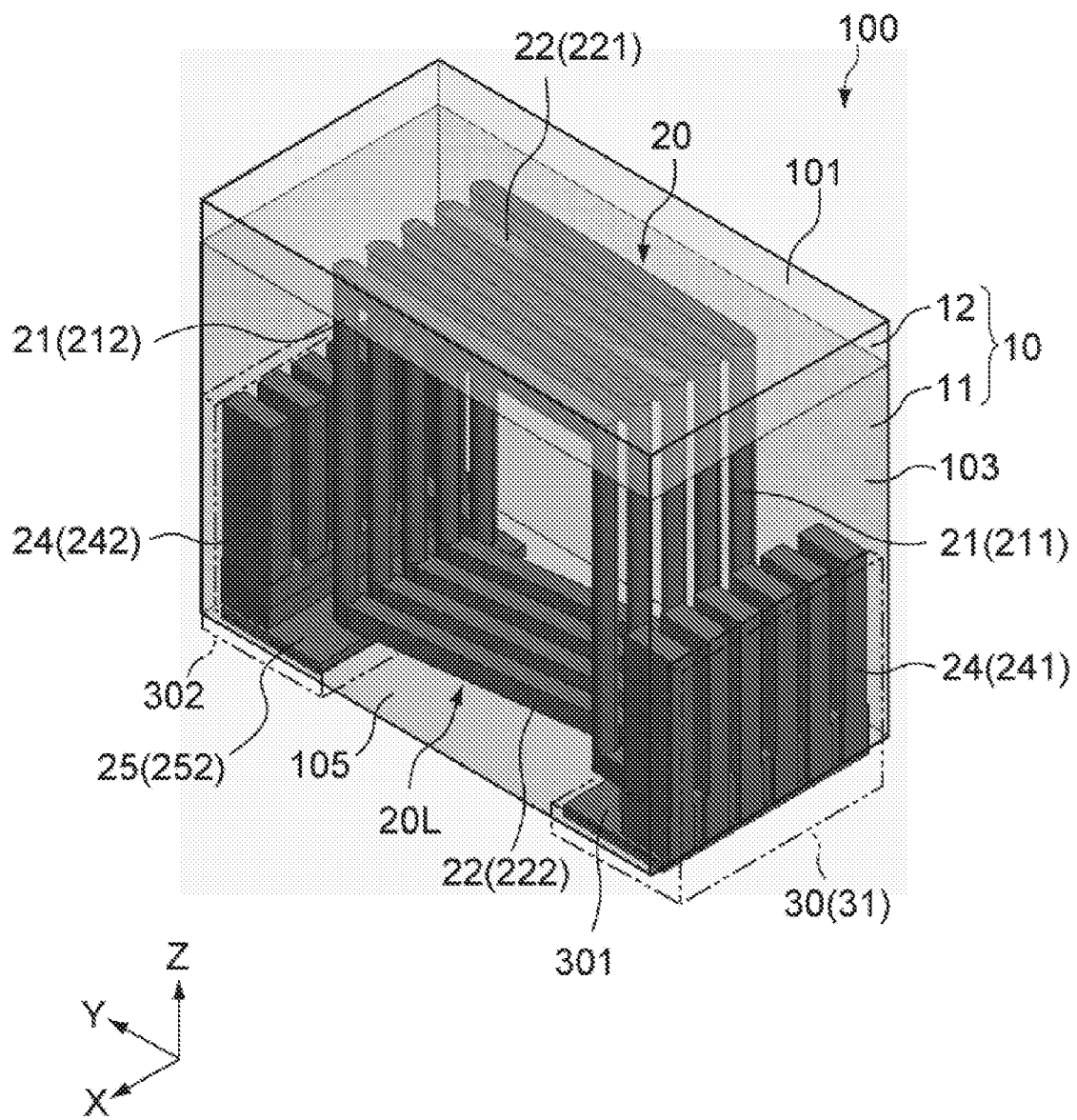
FIG. 1 is a schematic perspective view of an electronic component according to an embodiment of the disclosure.
Figure 2:
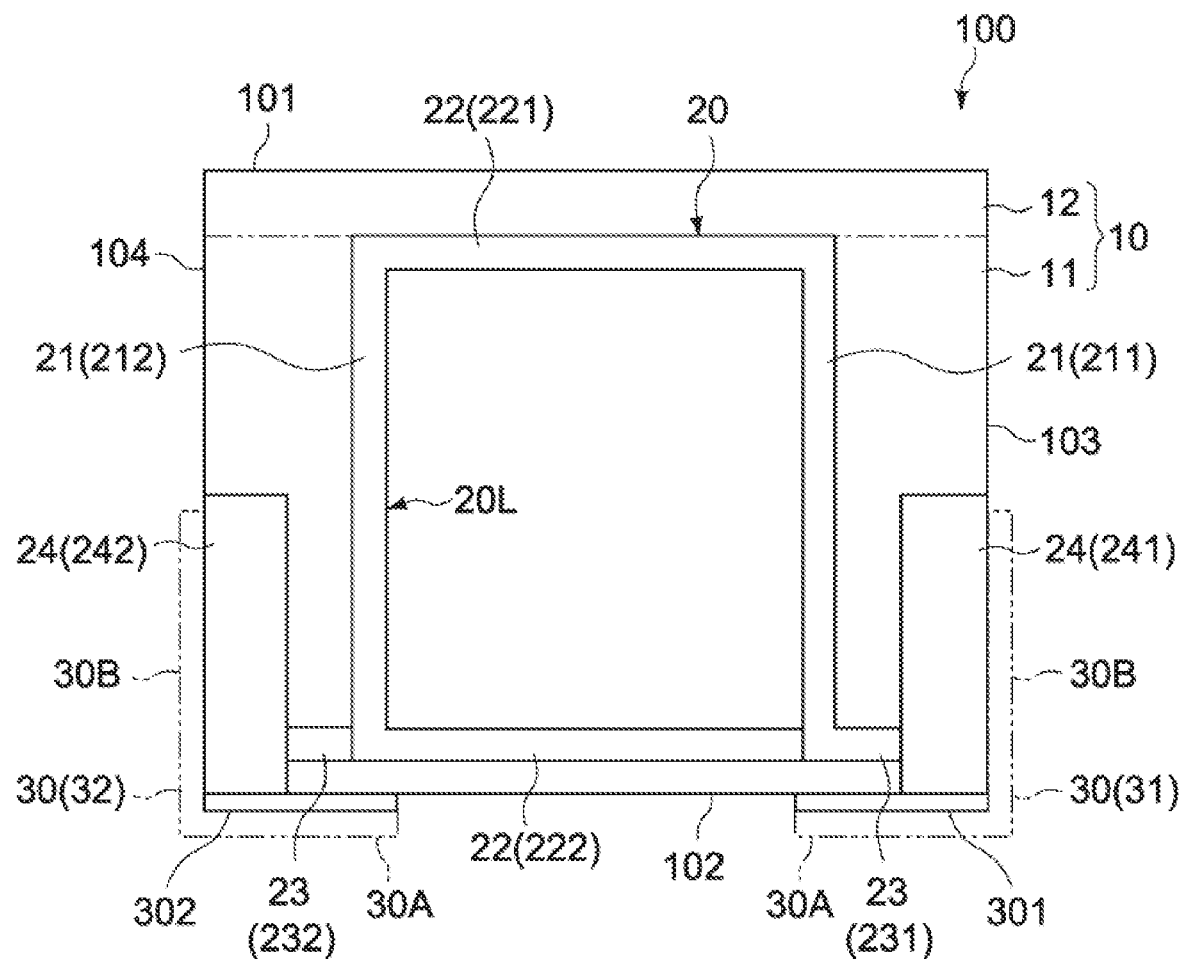
FIG. 2 is a schematic side view of the electronic component.
Figure 3:
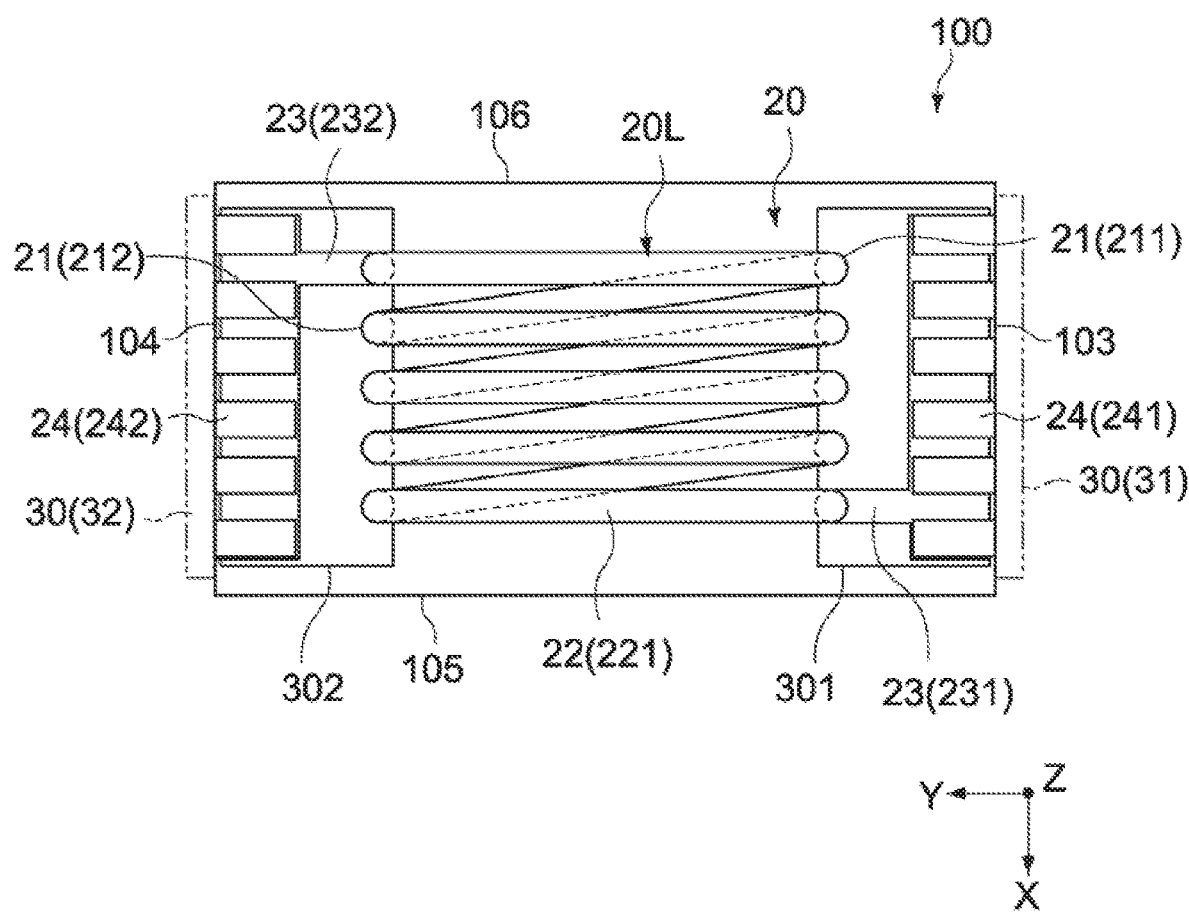
FIG. 3 is a schematic top view of the electronic component.

FIG. 1 is a schematic perspective view of an electronic component according to an embodiment of the disclosure, FIG. 2 is a schematic side view of the electronic component, and FIG. 3 is a schematic top view of the electronic component. In these drawings, the X-axis, Y-axis and Z-axis indicate three axial directions that are perpendicular to each other.

An electronic component 100 according to the embodiment may be configured as a coil component that is surface-mounted on a substrate. The electronic component 100 may include an insulator, an internal conductor 20, and an external electrode 30.

The insulator 10 may include a top surface 101, a bottom surface 102, a first end surface 103, a second end surface 104, a first side surface 105, and a second side surface 106. The insulator 10 is made in a cuboid shape that has the width in the X-axis direction, the length in the Y-axis direction and the height in the Z-axis direction. The insulator 10 may have a width of 0.05 to 0.3 mm, a length of 0.1 to 0.6 mm, and a height of 0.05 to 0.5 mm. In this embodiment, the width of the insulator 10 may be about 0.125 mm, the length may be about 0.25 mm, and the height may be about 0.2 mm.

The insulator 10 may include a body 11 and an upper portion 12. The body 11 may include the internal conductor 20 there inside and form a main part of the insulator 10. The upper portion 12 provides the top surface 101 of the insulator 10. The upper portion 12 may be formed as, for example, a printed layer on which a model number of the electronic component 100 is printed.

The body 11 and the upper portion 12 may be formed of an insulating material that mainly contains resin. The insulating material for the body 11 may be a resin that is cured by heat, light, a chemical reaction or the like. Such resins may include, for example, polyimide, epoxy resin, liquid crystal polymer, and the like. The upper portion 12 may be formed of the above-mentioned material, or a resin film or the like.

The insulator 10 may be formed of a composite material that includes a filler in the resin. As such a filler, ceramic particles such as silica, alumina, zirconia or the like may be typically used. Configuration of the ceramic particles may not be particularly limited but typically be spherical. Alternatively it may be an acicular shape, a scale-like shape or the like.

The internal conductor 20 may be provided inside the insulator 10. The internal conductor 20 may include a plurality of pillared conductive members 21 and a plurality of connecting conductive members 22. The plurality of pillared conductive members 21 and the plurality of connecting conductive members 22 together form a coil portion 20L.

The plurality of pillared conductive members 21 may be each formed in a substantially columnar shape with a central axis arranged in parallel with the Z-axis direction. The plurality of pillared conductive members 21 may include two groups of the conductors that are arranged so as to face to each other in the substantially Y-axis direction. One of the two conductor groups is first pillared conductive members 211 and the first pillared conductive members 211 are arranged in the X-axis direction at a predetermined interval. The other of the two conductor groups is second pillared conductive members 212 and the second pillared conductive members 212 are also arranged in the X-axis direction at a predetermined interval. The substantially columnar shape herein may include any prism of which cross section perpendicular to the axis (in the direction perpendicular to the central axis) is a circle, an ellipse, or an oval. For example, the substantially columnar shape may mean any prism whose cross section is an ellipse or an oval in which the ratio of the major axis to the minor axis is 3 or smaller.

The first pillared conductive members 211 and the second pillared conductive members 212 may be configured to have about the same radius and about the same height respectively. In the illustrated example, the first pillared conductive members 211 and the second pillared conductive members 212 may include five members each. As will be described later, the first and second pillared conductive members 211, 212 may be formed by stacking more than one via conductive members in the Z-axis direction. Note that the reason why the pillared members have the substantially same radius is to prevent increase of resistance and this may be realized by reducing variation in the dimension of the pillared members as viewed in the same direction to 10% or smaller. Moreover the reason why the pillared members have the substantially same height is to secure stacking accuracy of the layers and this may be realized by reducing a difference in the height of the pillared members to, for example, 1 μm or smaller.

The plurality of connecting conductive members 22 may include two groups of conductors that are formed in parallel with the XY plane and arranged so as to face to each other in the Z-axis direction. One of the two conductor group is first connecting conductive members 221 that extend along the Y-axis direction and are arranged in the X-axis direction at a predetermined interval so as to connect between the first pillared conductive members 211 and the second pillared conductive members 212 respectively. The other of the two conductor group is second connecting conductive members 222 that extend at a predetermined angle with the Y-axis direction and are arranged in the X-axis direction at a predetermined interval so as to connect between the first pillared conductive members 211 and the second pillared conductive members 212 respectively. In the illustrated example, the first connecting conductive members 221 may include five connecting conductive members and the second connecting conductive members 222 may include four connecting conductive members.

Referring aging to FIG. 1, the first connecting conductive members 221 are each connected with upper ends of a predetermined pair of the pillared conductive members 211, 212, and the second connecting conductive members 222 are each connected with lower ends of a predetermined pair of the pillared conductive members 211, 212. More specifically, the first and second pillared conductive members 211, 212 and the first and second connecting conductive members 221, 222 may be each connected to each other so as to form a rectangular helix in the X-axis direction. In this manner, provided is the coil portion 20L that has the central axis (a coil axis) in the X-axis direction and has a rectangular opening.

The internal conductor 20 may further include an extended portion 23, a comb-tooth block portion 24 and the coil portion 20L may be connected to the external electrode 30 (31, 32).

The extended portion 23 may include a first extended portion 231 and a second extended portion 232. The first extended portion 231 may be coupled to a lower end of the first pillared conductive member 211 that forms one end of the coil portion 20L, and the second extended portion 232 may be coupled to a lower end of the second pillared conductive member 212 that forms the other end of the coil portion 20L. The first and second extended portions 231, 232 may be provided in the XY plane in which the second connecting conductive members 222 are provided and may be arranged in parallel with the Y-axis direction.

The comb-tooth block portion 24 may include a first comb-tooth block 241 and a second comb-tooth block 242 that are disposed so as to face to each other in the Y-axis direction. The first and second comb-tooth blocks 241, 242 may each be arranged such that their comb tooth ends face upward in FIG. 1. A part of the first and second comb-tooth blocks 241, 242 may be exposed on the end surfaces 103, 104 and the bottom surface 102 of the insulator 10. The first and second extended portions 231, 232 may be coupled to a space between predetermined two adjacent comb teeth of the first and second comb-tooth block portions 241, 242 respectively (see FIG. 3). At the bottom of the first and second comb-tooth block portions 241, 242, conductive layers 301, 302 that are underlayers of the external electrode 30 may be provided respectively (see FIG. 2).

The external electrode 30 may form an external terminal for surface mounting and may include first and second external electrodes 31, 32 that face to each other in the Y-axis direction. The first and second external electrodes 31, 32 may be formed in designated regions on the outer surface of the insulator 10.

More specifically, the first and second external electrodes 31, 32 may each include a first portion 30A that covers each end of the bottom surface of the insulator 10 in the Y-axis direction, and a second portion 30B that covers the end surfaces 103, 104 of the insulator 10 over a predetermined height of the end surfaces 103, 104 as illustrated in FIG. 2. The first portions 30A may be electrically connected to the bottoms of the first and second comb-tooth block portions 241, 242 through the conductive layers 301, 302 respectively. The second portion 30B may be formed on the end surfaces 103, 104 of the insulator 10 so as to cover the comb teeth portions of the first and second comb-tooth block portions 241, 242.

The pillared conductive members 21, the connecting conductive members 22, the extended portion 23, the comb-tooth block portion 24, and the conductive layers 301, 302 may be formed of a metal such as Cu (copper), Al (aluminum), Ni (nickel) or the like. In this embodiment, these may be formed of copper or a copper alloy plated layer. The first and second external electrodes 31, 32 may be formed by, for example, Ni/Sn plating.

Figure 4:
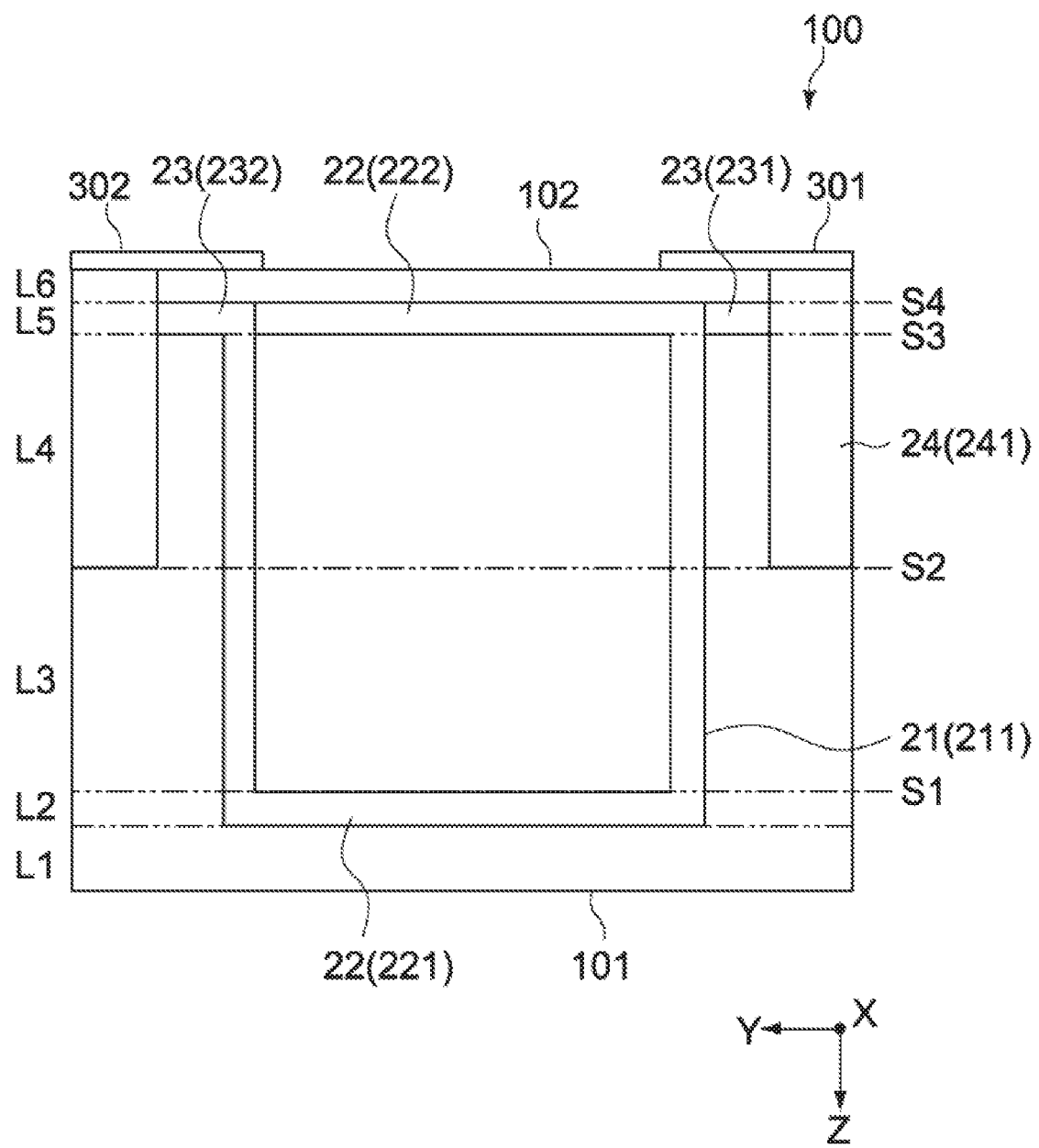
FIG. 4 is a schematic perspective view of the upside-down electronic component.

FIG. 4 is a schematic side view of the upside-down electronic component 100. Referring to FIG. 4, the electronic component 100 may include a film layer L1 and electrode layers L2-L6. In the embodiment, the film layer L1 and the electrode layers L1-L6 may be stacked sequentially in the Z-axis direction from the top surface 101 to the bottom surface 102. The number of the layers may not be particularly limited and may be six in this example.

The film layer L1 and the electrode layers L2-L6 may include elements of the insulator 10 and the internal conductor 20. FIGS. 5A-5F are schematic top views of the film layer L1 and the electrode layers L2-L6 of FIG. 4.

Figure 5A:
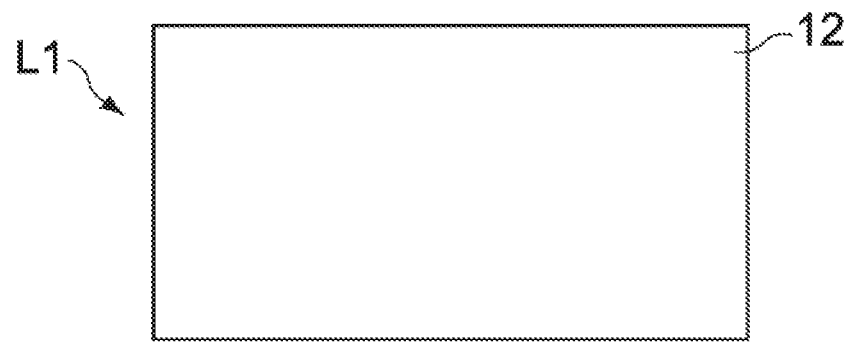
FIGS. 5A to 5F illustrate schematic top views of an electrode layer included in the electronic component.
Figure 5B:
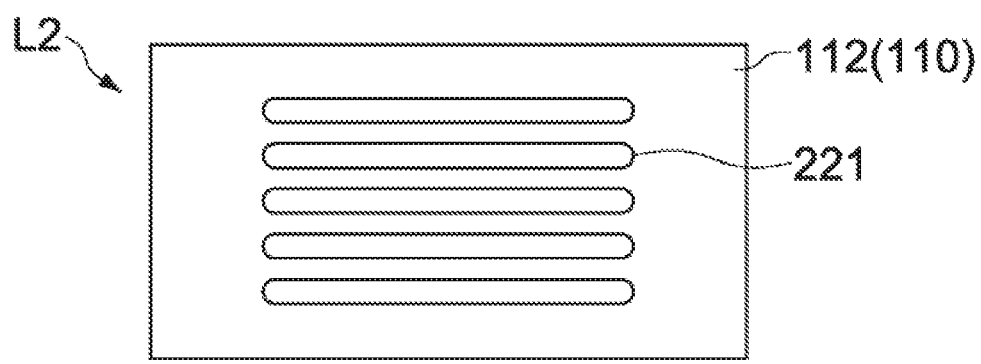
Figure 5C:
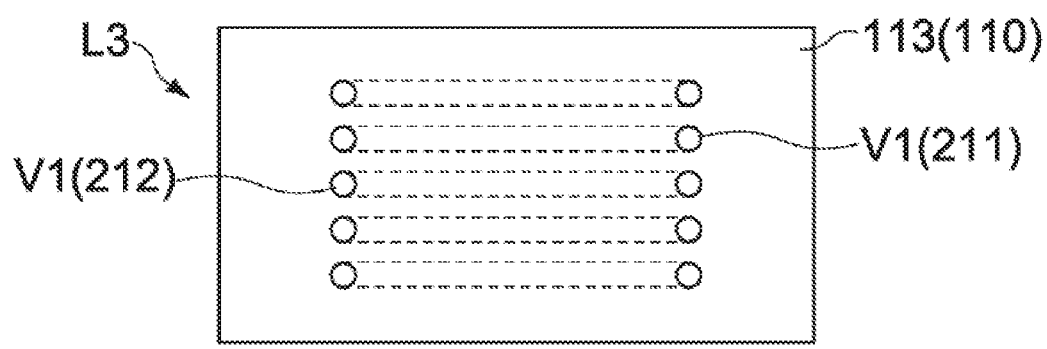
Figure 5D:
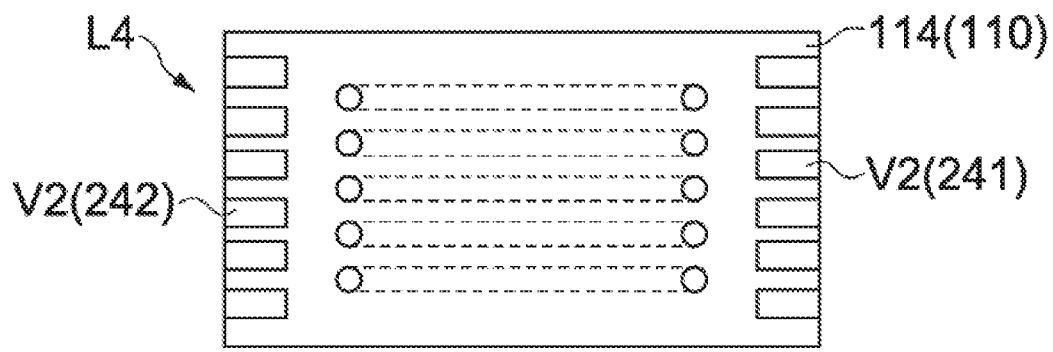
Figure 5E:
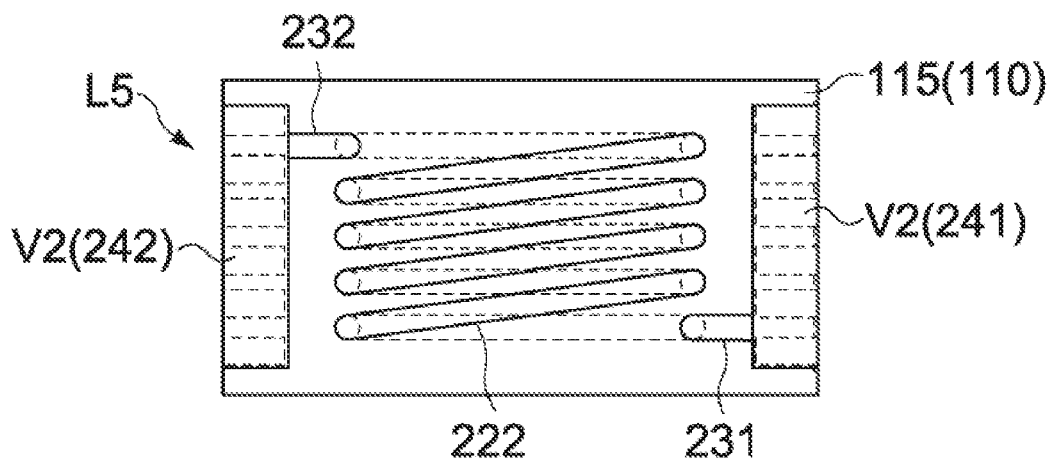
Figure 5F:
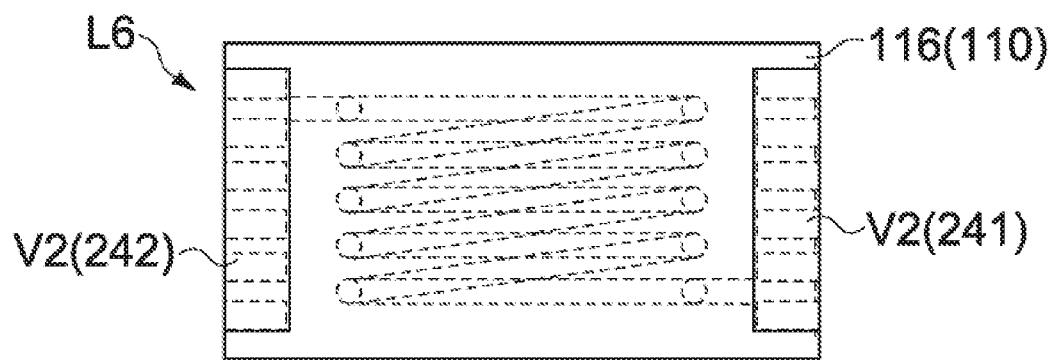

The film layer L1 may be formed of the upper portion 12 that serves as the top surface 101 of the insulator 10 (FIG. 5A). The electrode layer L2 may include an insulating layer 110 (112) that forms a part of the insulator 10 (the body 11), and the first pillared conductive members 211 (FIG. 5B). The electrode layer L3 may include the insulating layer 110 (113), and via conductive members V1 that form a part of the pillared conductive members 211, 212 (FIG. 5C). The electrode layer L4 may include the insulating layer 110 (114), the via conductive members V1, and via conductive members V2 that form a part of the comb-tooth block portions 241, 242 (FIG. 5D). The electrode layer L5 may include the insulating layer 110 (115), the via conductive members V1, V2, the extended portions 231, 232, and the second connecting conductive members 222 (FIG. 5E). The electrode layer L6 may include the insulating layer 110 (116) and the via conductive members V2 (FIG. 5F).

The electrode layers L2-L6 may be stacked in the height direction with bonding surfaces S1-S4 (see FIG. 4) interposed therebetween. Accordingly, the insulating layers 110 and the via conductive members V1, V2 have boundaries in the height direction. The electronic component 100 may be manufactured by a build-up method in which the electrode layers L2-L6 are sequentially fabricated and layered in the stated order from the electrode layer L2.

Basic Manufacturing Process

A basic manufacturing process of the electronic component 100 will be now described. A plurality of the electronic components 100 may be simultaneously fabricated on a wafer and may be then diced into pieces (chips).

FIGS. 6 to 8 are schematic sectional views of an element unit area to illustrate a part of the manufacturing process of the electronic component 100. More specifically, in the manufacturing process, a resin film 12A (the film layer L1) is adhered to a base plate S to form the upper portion 12 and the electrode layers L2 to L6 are sequentially formed thereon. As the base plate S, a silicon, glass or sapphire substrate may be used. Typically a conductive pattern that forms the internal conductor 20 may be formed by electroplating, subsequently the formed conductive pattern may be covered by an insulating resin material to form the insulating layer 110. These steps may be repeated.

FIGS. 6A to 6E and FIGS. 7A to 7D illustrate a manufacturing process of the electrode layer L3.

Figure 6A:
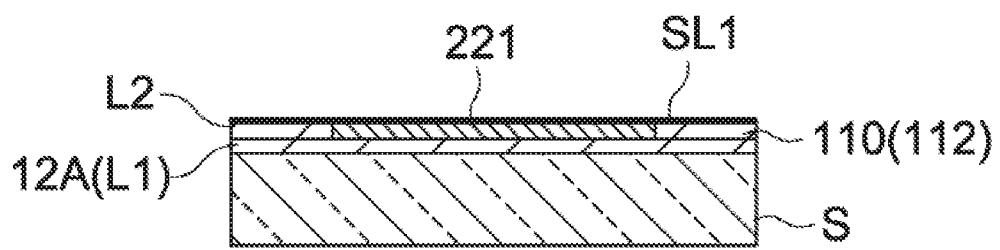
FIGS. 6A to 6E are schematic sectional views of an element unit area to illustrate a basic manufacturing flow of the electronic component.

In this process, a seed layer (a feed layer) SL1 for electroplating may be formed on the surface of the electrode layer L2 by, for example, sputtering (FIG. 6A). The seed layer SL1 may be formed of any conductive material, for example, Ti (titanium) or Cr (chromium). The electrode layer L2 may include the insulating layer 112 and the connecting conductive members 221. The connecting conductive members 221 may be provided under the insulating layer 112 so as to contact the resin film 12A.

Figure 6B:
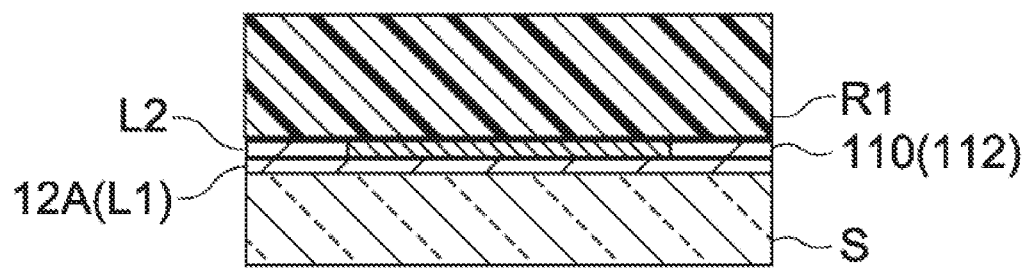
Figure 6C:
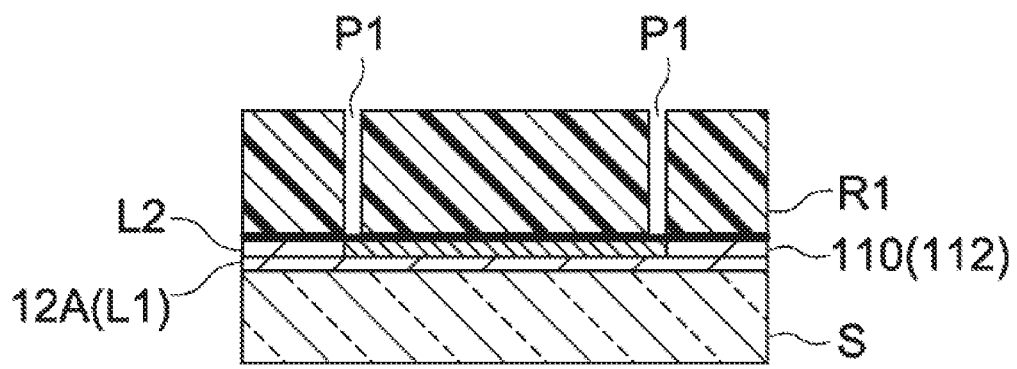
Figure 6D:
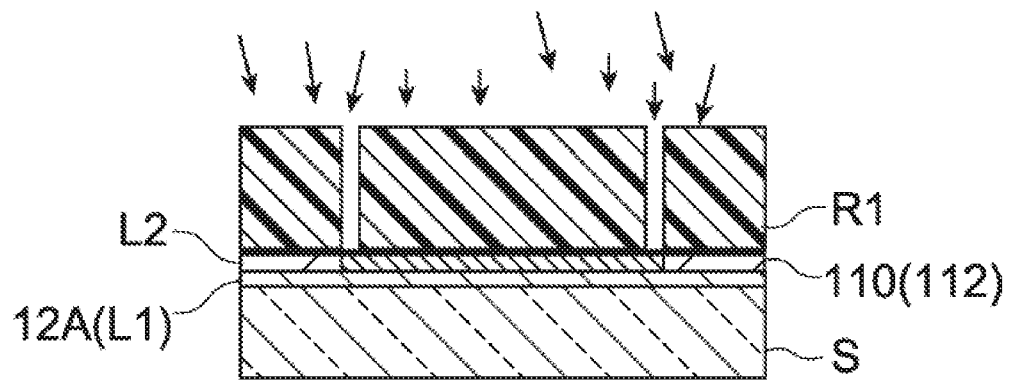

Subsequently a resist film R1 may be formed on the seed layer SL1 (FIG. 6B). The resist film R1 may be exposed and developed to form a resist pattern having openings P1 that face the via conductive members V13 which form a part of the pillared conductive members 21 (211, 212) through the seed layer SL1 (FIG. 6C). Subsequently a descum process may be performed to remove resist residue in the opening P1 (FIG. 6D).

Figure 6E:
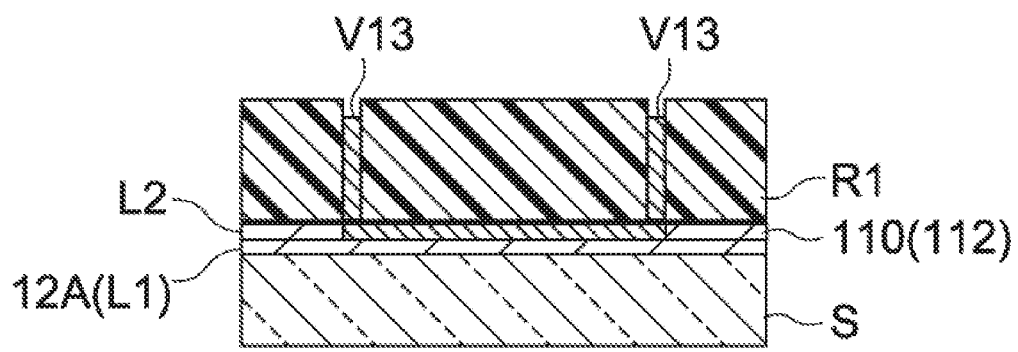
Figure 7A:
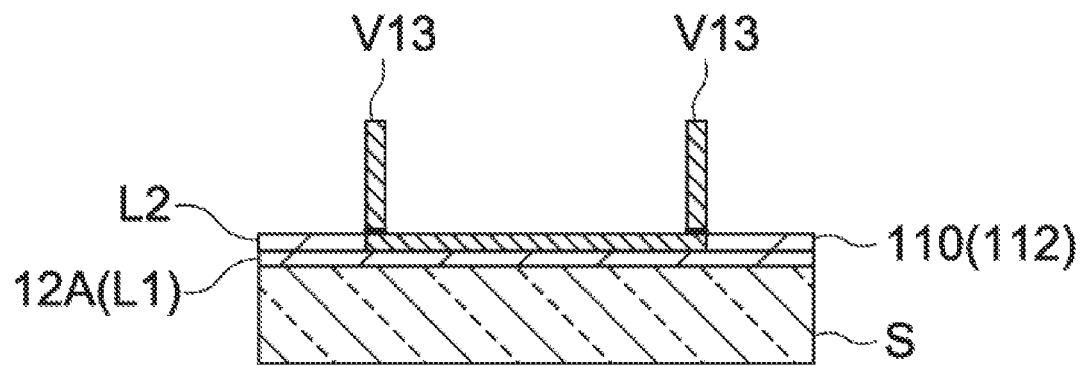
FIGS. 7A to 7D are schematic sectional views of an element unit area to illustrate a basic manufacturing flow of the electronic component.
Figure 7B:
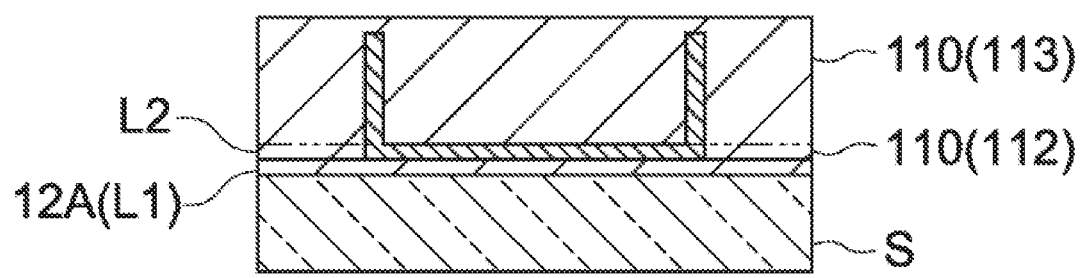
Figure 7C:
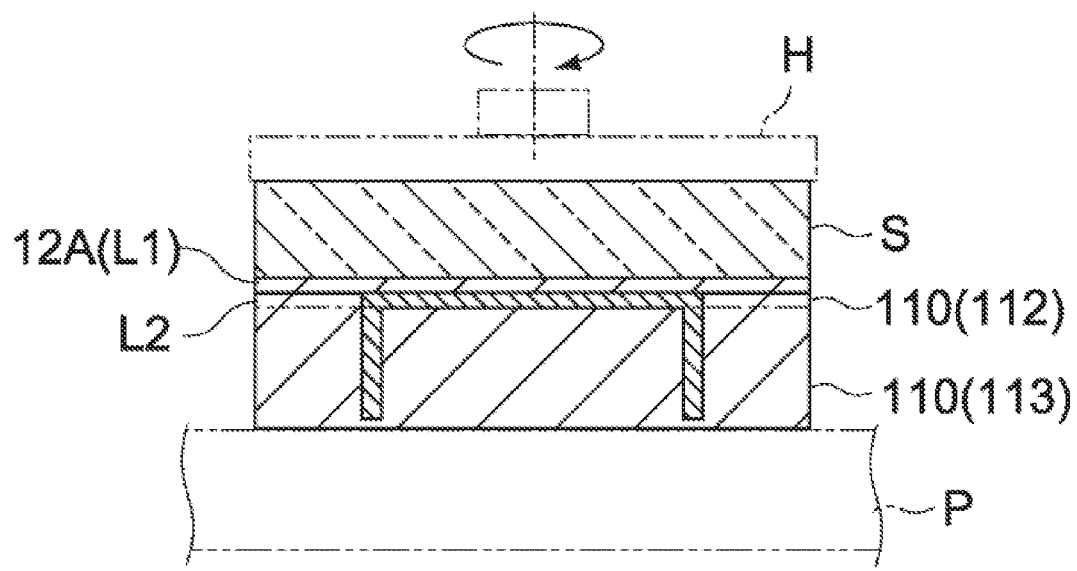
Figure 7D:
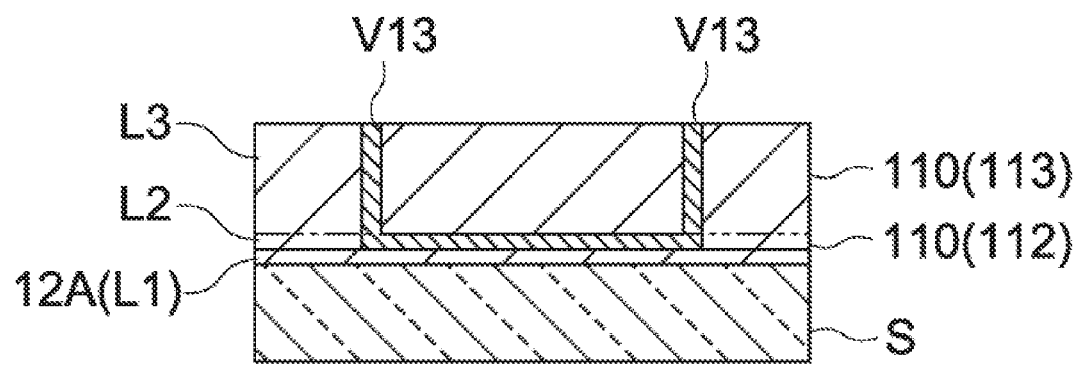

The base plate S may be then immersed in a Cu plating bath and an voltage may be applied to the seed layer SL1 to form the plurality of via conductive members V13 made of a Cu plating layer within the openings P1 (FIG. 6E). After the resist film R1 and the seed layer SL1 may be removed (FIG. 7A), the insulating layer 113 that covers the via conductive members V13 may be formed (FIG. 7B). The insulating layer 113 may be formed by printing or applying a resin material or applying a resin film on the electrode layer L2 and then hardening the resin. After the resin is hardened, the surface of the insulating layer 113 may be polished so as to expose tips of the via conductive members V13 by using a polishing apparatus such as a chemical mechanical polish machine (CMP machine), a grinder or the like (FIG. 7C). FIG. 7C illustrates an example of the polishing process (CMP) of the insulating layer 113 with a revolving polishing pad P. Here, the base plate S may be placed upside down on a polishing head H that is capable of spinning. As described above, the electrode layer L3 may be formed on the electrode layer L2 (FIG. 7D).

A fabrication method of the insulating layer 112 has not been described above, but it may be typically formed in the same manner as the insulating layer 113, more specifically, a resin material may be printed or applied or a resin film may be applied and then cured. The cured resin may be then polished by chemical mechanical polishing (CMP), a grinder or the like.

In the same manner as described above, the electrode layer L4 may be formed on the electrode layer L3.

A plurality of via conductive members (second via conductive members) that are coupled to the via conductive members V13 (first via conductive members) may be formed on the insulating layer 113 (a second insulating layer) of the electrode layer L3. More specifically, a seed layer that covers the surface of the first via conductive members may be formed on the surface of the second insulating layer. A resist pattern that has openings at the position corresponding to the surface of the first via conductive members may be then formed and the second via conductive members may be formed by electroplating using the resist pattern as a mask. A third insulating layer that covers the second via conductive members may be subsequently formed on the second insulating layer. The surface of the third insulating layer may be then polished to expose tips of the second via conductive members.

In the above-described fabrication process of the second via conductive members, the via conductive members V2 that form a part of the comb-tooth block portion 24 (241, 242) may be formed at the same time (see FIG. 4 and FIG. 5D). In this case, the resist pattern has openings that correspond to the region where the via conductive members V2 are formed in addition to the openings that correspond to the region where the second via conductive members are formed.

FIGS. 8A to 8D illustrate a part of the manufacturing process of the electrode layer L5.

Figure 8A:
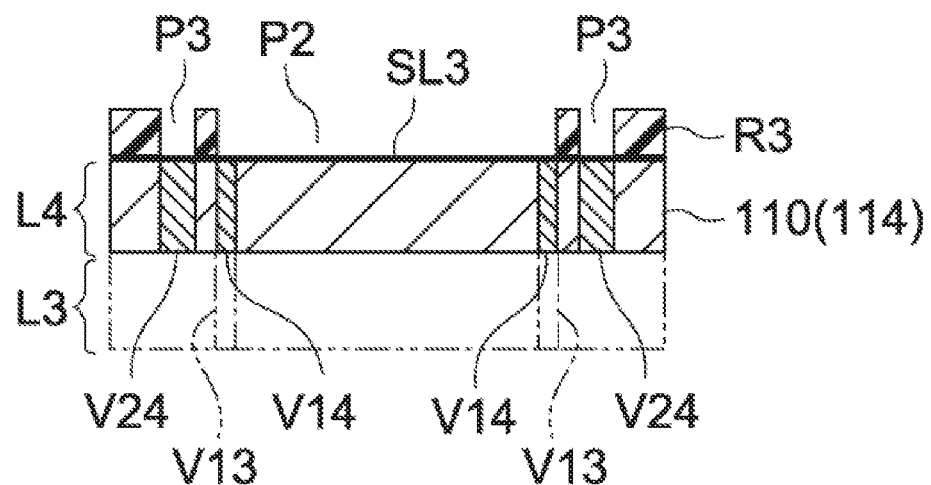
FIGS. 8A to 8D are schematic sectional views of an element unit area to illustrate a basic manufacturing flow of the electronic component.
Figure 8B:
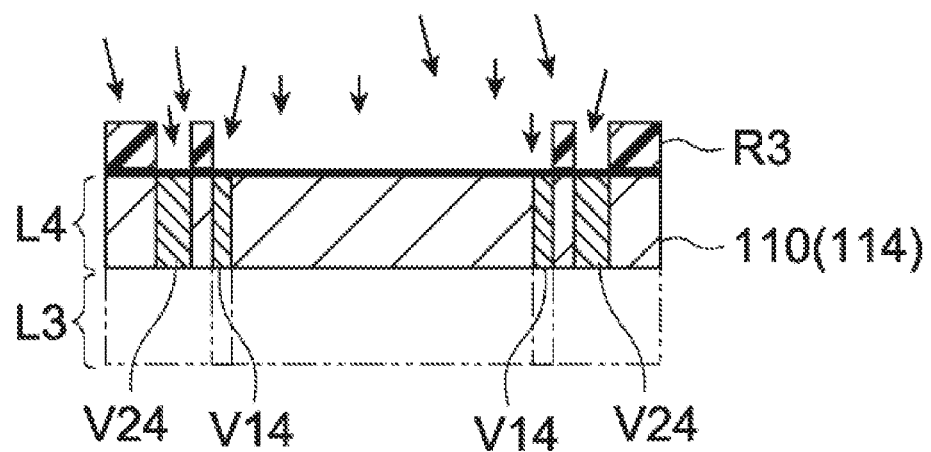

A seed layer SL3 for electroplating may be firstly formed on the electrode layer L4, and then a resist pattern (a resist film R3) that has openings P2, P3 may be sequentially formed on the seed layer SL3 (FIG. 8A). Subsequently a descum process may be performed to remove resist residue in the openings P2, P3 (FIG. 8B).

The electrode layer L4 may include the insulating layer 114 and via conductive members V14, V24. The via conductive members V14 may correspond to the via members (V1) that form a part of the pillared conductive members 21 (211, 212), and the via conductive members V24 may correspond to the via members (V2) that correspond to a part of the comb-tooth block portion 24 (241, 242) (see FIGS. 5C and 5D). The opening P2 may face the via conductive member V14 in the electrode layer L4 with the seed layer SL3 interposed therebetween, and opening P3 may face the via conductive member V24 in the electrode layer L4 with the seed layer SL3 interposed therebetween. The openings P2 may be each formed in the shape that conforms with the corresponding connecting conductive member 222.

Figure 8C:
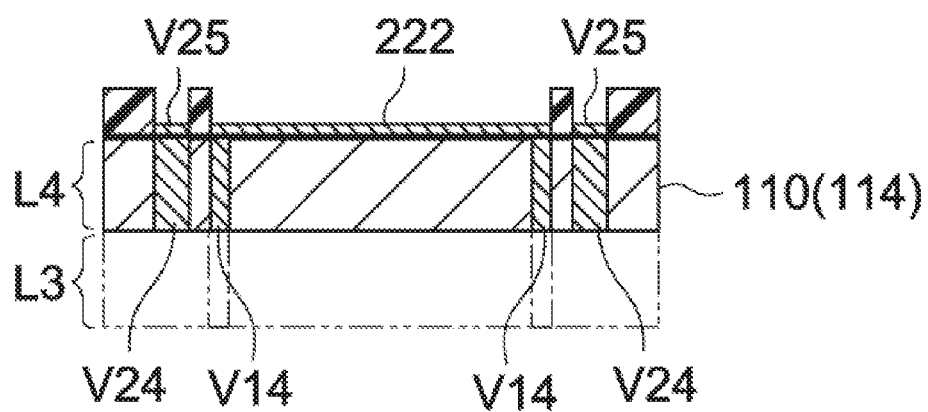

The base plate S may be then immersed in a Cu plating bath and an voltage may be applied to the seed layer SL3 to form via conductive members V25 and the connecting conductive members 222 made of a Cu plating layer within the openings P2, P3 (FIG. 8C). The via conductive members V25 may correspond to the via members (V2) that form a part of the comb-tooth block portion 24 (241, 242).

Figure 8D:
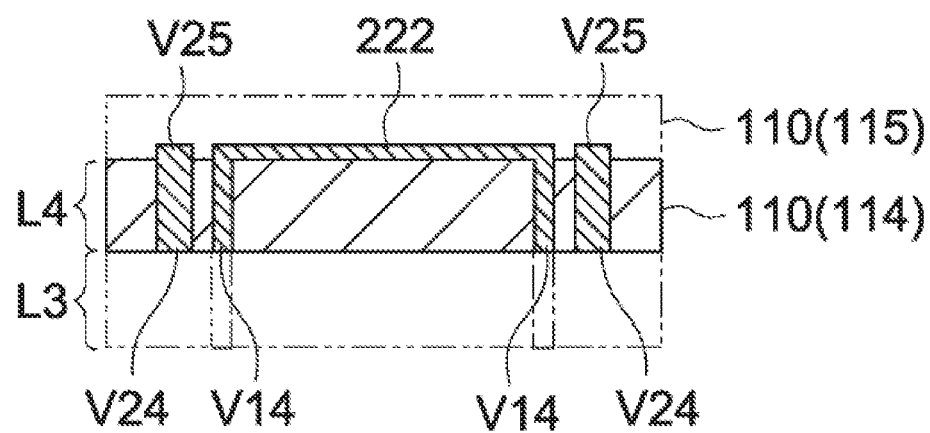

After the resist film R3 and the seed layer SL3 are removed (FIG. 8D), the insulating layer 115 that covers the via conductive members V25 and the connecting conductive members 222 may be formed (FIG. 8D). Although it is not illustrated in the drawings, the surface of the insulating layer 115 may be polished to expose tips of the via conductive members V25, the seed layer and the resist pattern may be subsequently formed, and the electroplating process may be then performed. By repeating the above-described processes, the electrode layer L5 illustrated in FIG. 4 and FIG. 5E is fabricated.

After the conductive layers 301, 302 are formed on the comb-tooth block portion 24 (241, 242) exposed on the surface (the bottom surface 102) of the insulating layer 115, the first and second external electrodes 31, 32 may be formed.

Structure In The Embodiment

When an insulator and an internal conductor are formed of layers, a contraction stress caused by a hardening process of an insulating layer may act on a bonded portion between an upper conductive layer and a lower conductive layer, which may result in damage of the conductor.

Figure 9A:
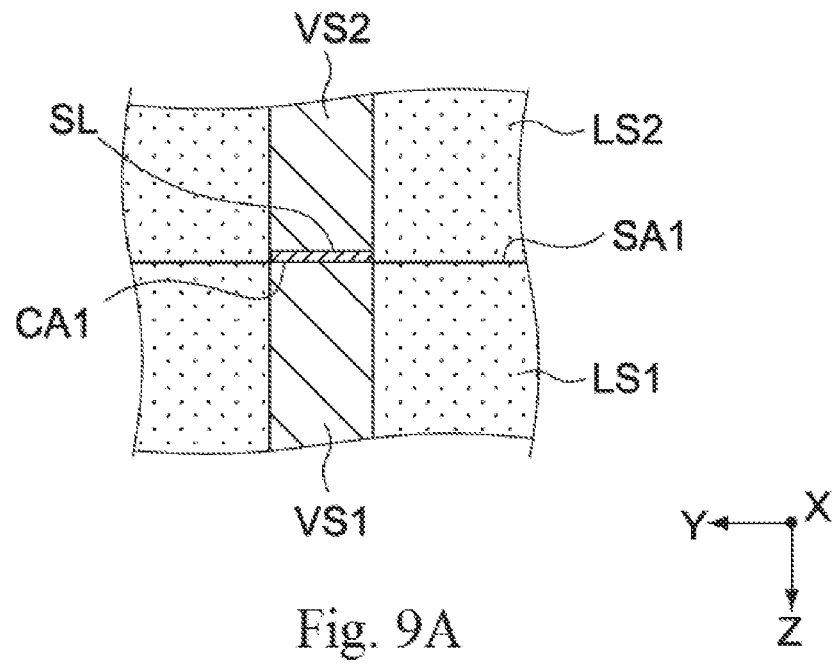
FIGS. 9A and 9B are a schematic sectional views of a main part of an electronic component of a comparative example illustrating an internal structure and operation of the component.

FIG. 9A illustrates that a contact CA1 that is situated between a via conductive member VS1 in a lower layer and a via conductive member VS2 in an upper layer lies in the substantially same plane (the XY plane) as a bonding surface SA1 between an insulating layer LS1 situated in the lower layer and an insulating layer LS2 situated in the upper layer. The contact CA1 may correspond to the seed layer SL situated between the two via conductive members VS1, VS2. The both sides of the seed layer SL may form contact surfaces for the via conductive members VS1, VS2. In the illustrated example, the interface between the seed layer SL and the via conductive member VS1 in the lower layer lies in the same plane as the bonding surface SA1.

Figure 9B:
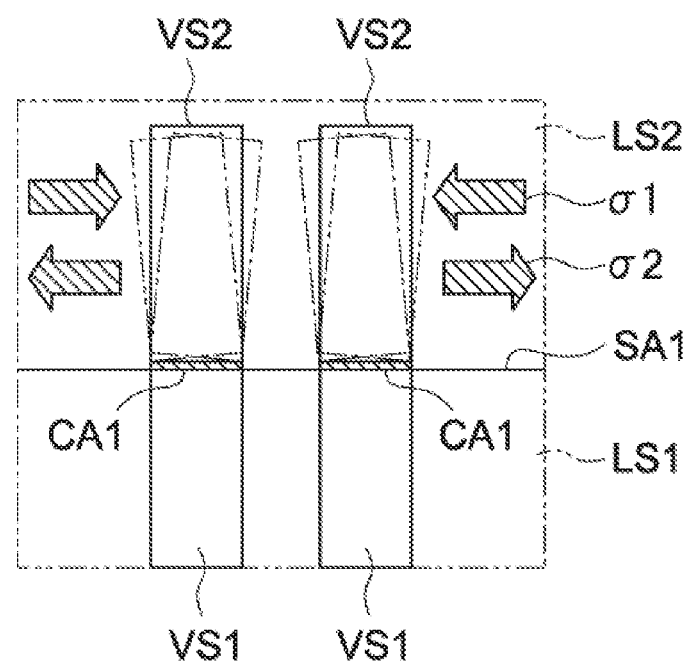

When the contact CA1 and the bonding surface SA1 are in substantially the same plane, a contraction stress ($\sigma1$) generated by a hardening process of the insulating layer LS2 may act on the via conductive member VS2 that has been already formed. The stress may tend to concentrate especially on the contact CA1 that may have a low strength as schematically illustrated in FIG. 9B. Moreover when the electronic component is heated or cooled during an environmental testing and the like, a thermal stress ($\sigma2$) caused by a difference of the thermal expansion rate between the insulating layer LS2 and the via conductive member VS2 tends to concentrate on the contact CA1. Consequently the contact CA1 may be damaged and, in the worst case scenario, the contact CA1 may be separated or fractured, resulting in a connection failure between the via conductive member VS1 and the via conductive member VS2. This kind of problem becomes significant as the via diameter decreases or the via length increases. Therefore this becomes one of the factors that hampers the miniaturization of the internal conductor.

Figure 10A:
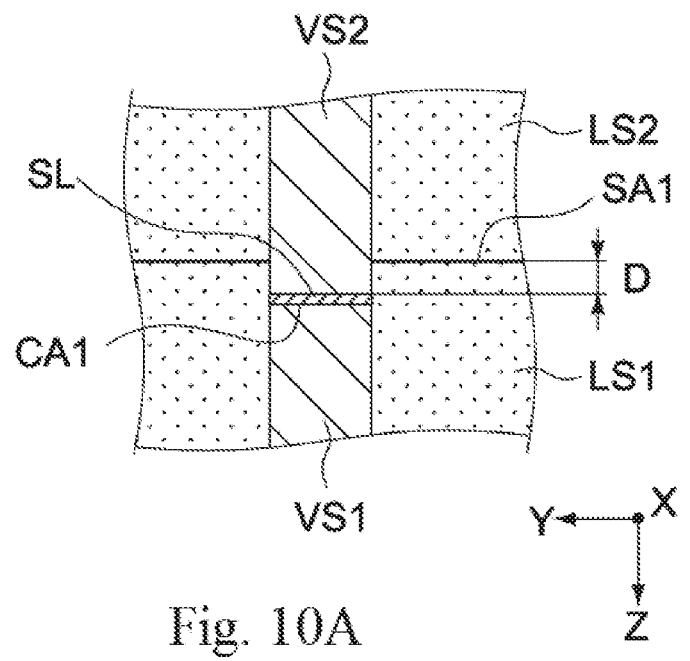
FIGS. 10A and 10B are schematic sectional views of a main part of an electronic component of one embodiment of the disclosure illustrating an internal structure and operation of the electronic component.
Figure 10B:
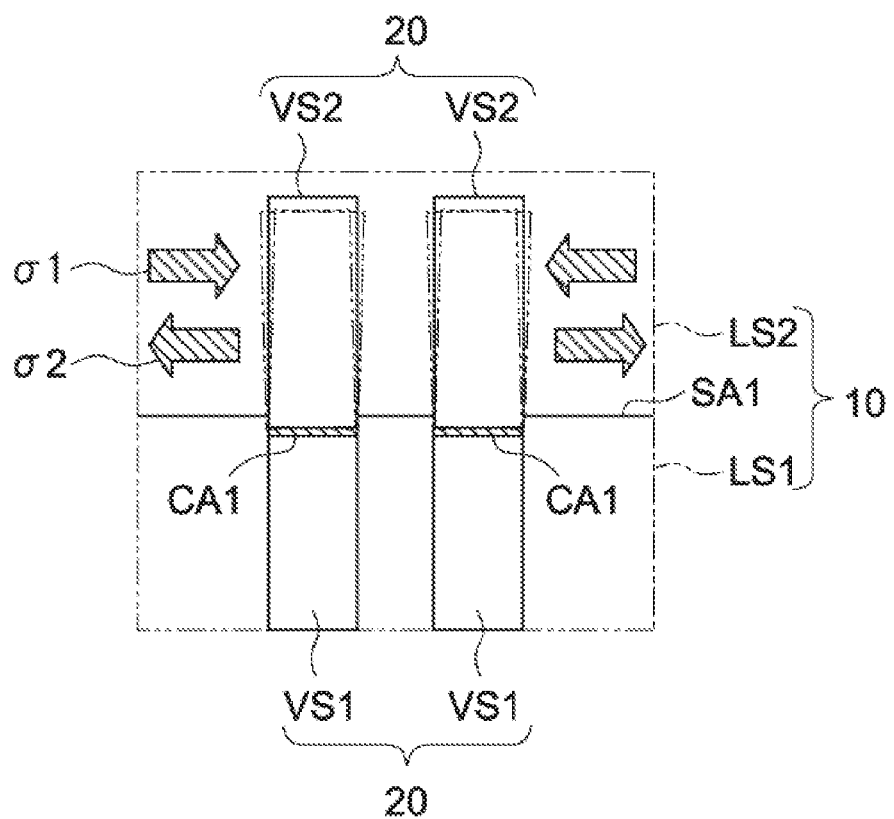

To address this problem, in the electronic component 100 according to the embodiment, the contact CA1 is disposed at an offset position in the height direction with reference to the bonding surface SA1 as illustrated in FIG. 10A. The structure of the electronic component 100 according to the embodiment will be now described in detail.

As described above, the electronic component 100 according to the embodiment may include the insulator 10 and the internal conductor 20. For example, as shown in FIG. 10A, the insulator 10 may include the lower insulating layer LS1 (a first insulating layer) that has the bonding surface SA1 (a first bonding surface) orthogonal to the Z-axis direction, and the upper insulating layer LS2 (a second insulating layer) bonded to the bonding surface SA1. The insulator 10 is made of a material containing a resin. The internal conductor 20 may include a plurality of the via conductive members VS1 (first via conductive members) provided in the insulating layer LS1 and a plurality of the via conductive members VS2 (second via conductive members) provided in the insulating layer LS2. Each of the via conductive members VS1 may have the contact CA1 (a first contact) connected to the corresponding via conductive member VS2 at a position offset in the Z-axis direction with respect to the bonding surface SA1.

In the electronic component configured as described above, the contact CA1 does not lie in the same plane as the bonding surface SA1 but is provided at a position offset from the bonding surface SA1 in the stacking direction of the insulating layers LS1, LS2. The thickness of the contact CA1 is not particularly limited, for example, 30 nm to 250 nm (both inclusive). The contact CA1 in the embodiment may be provided in the lower insulating layer LS1, so that the region located on the same plane as the bonding surface SA1 of the via conductive member VS2 may be formed of a Cu plating-grown surface.

Therefore, a stress caused by shrinkage of the insulating layer LS2 during hardening of the insulating layer or caused by other factor is received mainly by the surface on which the Cu plating has been grown above the contact CA1, rather than the contact CA1 that has a relatively low strength in the internal conductor 20. Therefore the contact CA1 may be less damaged and the via conductive members VS1 and VS2 are stably connected. This makes it possible to achieve the miniaturization of the internal conductor 20 while preventing breakage of the internal conductor 20 due to the stress applied by the insulator 10.

An offset D (FIG. 10A) between the contact CA1 and the bonding surface SA1 in the stacking direction refers to the distance between the bonding surface SA1 and the contact surface between the contact CA1 and the via conductive member VS2. The amount of the offset D may not be particularly limited as long as the contact CA1 does not lie in the same plane as the bonding surface SA1. Whether or not they are on the same plane can be determined by, for example, checking whether or not the connecting surfaces of the contact CA1 and the bonding surface SA1 are continuous to each other as viewed in a cross section in the YZ plane. More specifically, in a photograph enlarged 10000 times, a straight line with a width of 0.1 mm may be drawn on the bonding surface SA1, and if the straight line overlaps the contact CA1, it is determined that they are on the same plane, and if they do not overlap it is determined that they are not on the same plane.

The offset D may be set to an appropriate value with which the stress concentration on the contact CA1 can be prevented, and may be typically 30 nm or more and 10 nm or less. When the offset D is less than 30 nm, the seed layer SL that forms the contact CA1 cannot have a sufficient thickness, or the connection surface between the seed layer SL and the via conductive member VS2 becomes close to the bonding surface SA1. Consequently it is inevitable that a stress caused by shrinkage of the insulating layer LS2 during hardening of the layer concentrates on the contact CAL Whereas when the offset D is more than 10 μm, a fabrication process of the contact CA1 may become complicated.

The inventors of the present disclosure fabricated 30 samples of the connection illustrated in FIGS. 9A and 10A, each of which includes the insulating layers LS1 and LS2 made of an epoxy resin containing spherical silica microparticles, the via conductors VS1 and VS2 made of a Cu plating layer with a via diameter of 25 μm and a via length of 20 μm, and the contact CA1 made of a Ti sputtering film having a thickness of 100 nm. In the samples that have the connection illustrated in FIG. 10A, the offset D was 200 nm. For each sample, a heat cycle test in the range of −55° C. to 150° C. was performed for 1000 cycles, and the number of open defects was counted. The results found that the open defect ratio was 0% for the structure shown in FIG. 10A, whereas the open defect ratio was 10% for the structure shown in FIG. 9A. In addition, samples having the structure shown in FIG. 10A with a via diameter of 20 μm and 15 μm were fabricated and evaluated in the same manner. The result found that open defects were not observed in any of the samples.

In particular, in the above-described evaluation, since the samples each have the connecting conductive members 22, open defects would have been likely to occur in the contacts situated close to the first connecting conductive member 221 or the second connecting conductive member 222 where are susceptible to the thermal stress in the Y-axis direction due to the length of each connecting conductive member. However, even in this situation, the influence of the stress was eliminated.

FIGS. 11A to 11D illustrate a fabrication step of the contact CA1 in the method of manufacturing the electronic component 100 according to the embodiment.

Figure 11A:
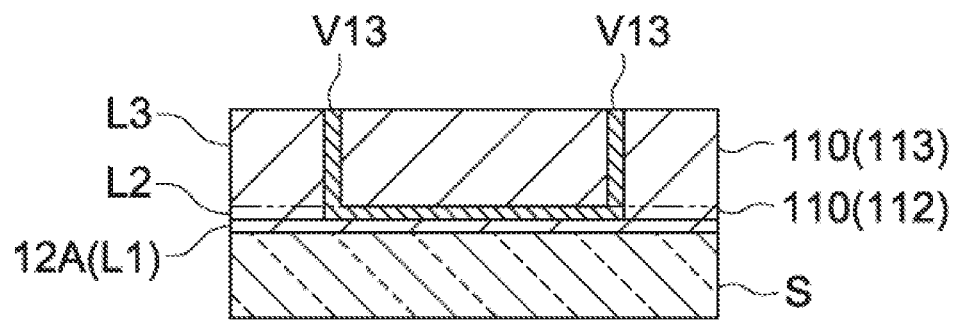
FIGS. 11A to 11D are schematic sectional views of an element unit area to illustrate a manufacturing method of the electronic component.

FIG. 11A is a schematic sectional view of the electronic component in which the electrode layer L3 has been formed (FIG. 7D) for describing a fabrication process of the electrode layer L4.

Figure 11B:
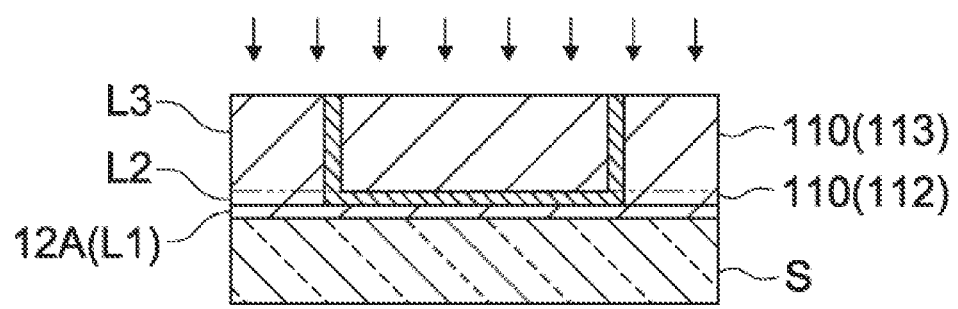
Figure 11C:
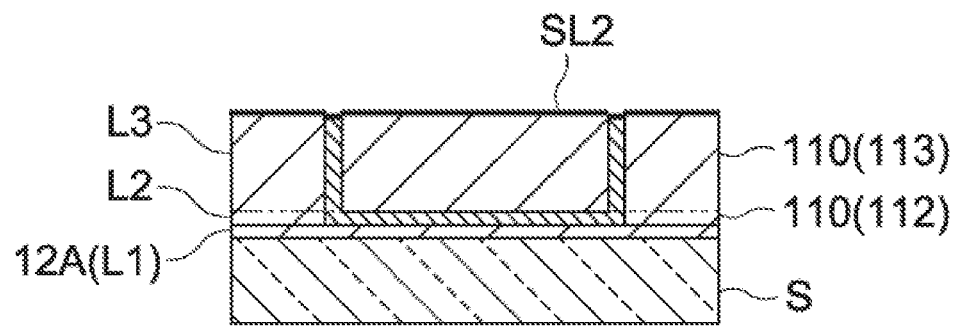

In this state, the surface of the insulating layer 113 and the upper ends of the via conductive members V13 may be leveled in the same plane since the surface of the insulating layer 113 has been polished. In this embodiment, before the seed layer SL2 is formed, the surface of the via conductive members V13 that are exposed on the surface of the insulating layer 113 may be selectively etched as illustrated in FIGS. 11B and 11C. In this way, the upper ends of the via conductive members V13 are situated at a lower level than the surface of the insulating layer 113.

The etching of the via conductive members V13 may be wet-etching or dry-etching. An etching mask may be used or may not be used in the etching. When an etching mask is not used, an enchant or an etching gas that has a high etching selectivity for copper of the via conductive members V13 rather than the resin material of the insulating layer 113 may be used. An etching amount for the via conductive members V13 may be, for example, 30 nm to 10 μm (both inclusive) and the etching amount can be controlled typically by an etching time.

Figure 11D:
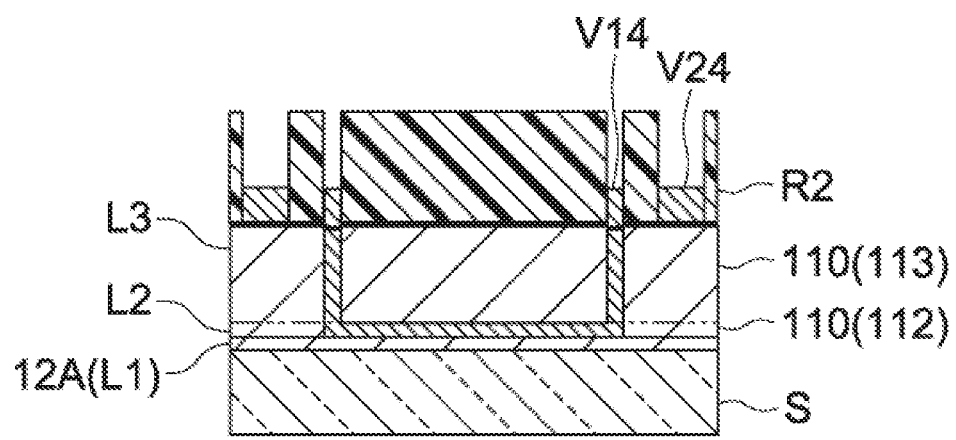

Subsequently the seed layer SL2 and a resist mask (a resist film R2) may be formed on the surface of the insulating layer 112, and then the via conductive members V14 may be formed on the via conductive members V13 by electroplating as illustrated in FIGS. 11C and 11D. In this manner, the internal conductor that includes the contact CA1 of FIG. 10A may be fabricated.

By performing the above-described etching process of the via conductive members on each electrode layer, the contacts CA1, CA2 may be formed at positions offset in the Z-axis direction with respect to the bonding surfaces SA1, SA2 of the insulating layers LS1 to LS3.

Here, the insulating layers LS1 to LS3 correspond to the insulating layers 113 to 115 of the electrode layers L3 to L5, respectively, and the via conductive members VS1 to VS3 correspond to the via conductive members V13 and V14 and the connecting conductive member 222, respectively. The contact CA1 and the bonding surface SA1 correspond to the contact between the via conductive member VS1 and the via conductive member VS2 and the bonding surface between the insulating layer LS1 and the insulating layer LS2, respectively. The contact CA2 and the bonding surface SA2 correspond to the contact between the via conductive member VS2 and the via conductive member VS3 and the bonding surface between the insulating layer LS2 and the insulating layer LS3, respectively.

Figure 12:
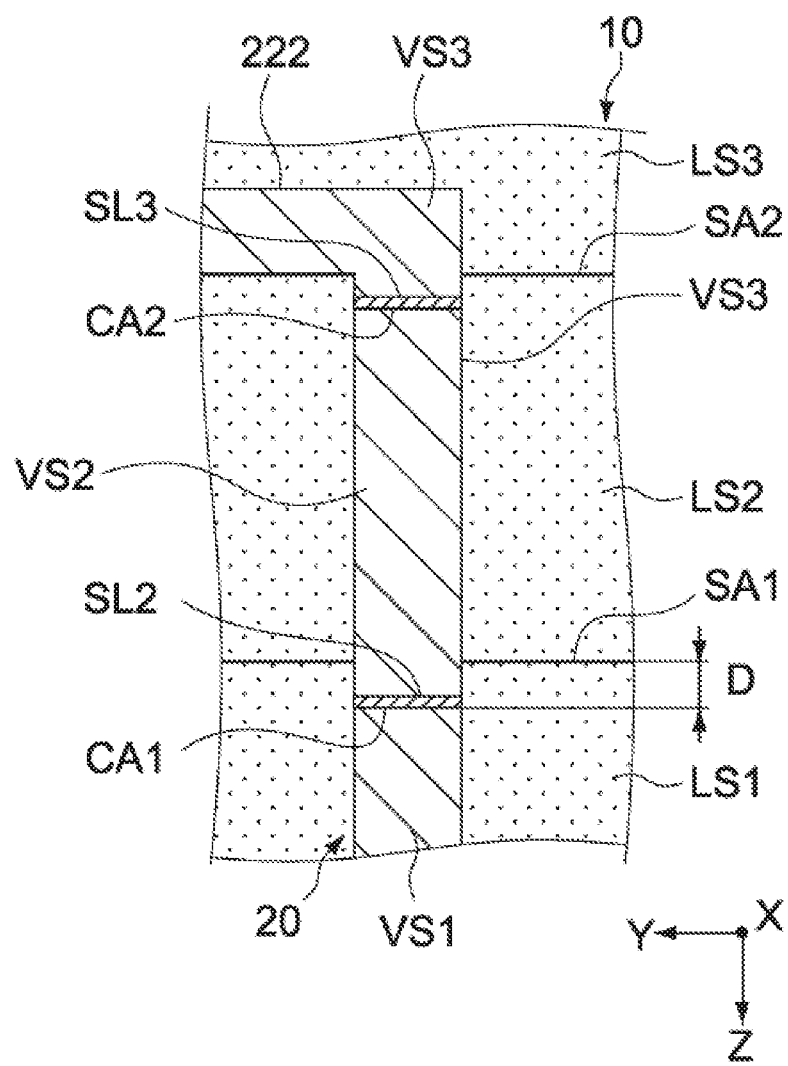
FIG. 12 is a schematic sectional view of a main part of the electronic component illustrating an internal structure of the component.

Referring to FIG. 12, the insulator 10 may further include the insulating layer LS3 (a third insulating layer) that has the bonding surface SA2 (a second bonding surface) bonded to the insulating layer LS2 (the second insulating layer). The internal conductor 20 may further include the via conductive member VS3 (a third via conductive member) provided the insulating layer LS3. The via conductive member VS3 may have the contact CA2 (a second contact) connected to the corresponding via conductive member VS2 at a position offset in the Z-axis direction with respect to the bonding surface SA2.

According to the electronic component 100 in the above-described embodiment, the contacts CA1, CA2 are disposed at positions offset in the stacking direction (the Z-axis direction) with respect to the bonding surfaces SA1, SA2 of the layers that form the insulator 10 so that it is possible to effectively prevent the internal conductor 20 from being damaged due to the contraction of the hardened insulating layers LS1 to LS3 and the thermal stress. Consequently the miniaturization of the internal conductor 20 becomes possible and therefore downsizing of the electronic component 100 becomes possible.

According to the embodiment, it is possible to reduce the outer diameter (the thickness in the radial direction of the via) of the via conductive member that forms the pillared conductive member 21 to about 20 μm or less (for example, 15 μm). Moreover when the coil portion 20L is formed, narrowing of the pitch of the pillared conductive members 21 or the connecting conductive members 22 can be easily realized. Therefore, a compact coil component having the overall dimension of 0.2 mm or less can be stably manufactured. Moreover, since the via conductive members are made of copper, it is possible to reduce migration and consequently it is possible secure a stable connection reliability of the internal conductor 20 that has a fine structure.

The outer diameters of the pillared conductive members are not necessarily all the same in the axial direction and may partially include a barrel shape or a hourglass shape.

For example, a part of the via conductive member may be slightly thinned by providing the via conductive member with a taper portion in the vertical direction or providing the contact with a constriction in the outer diameter direction of the contact. When the pillared conductive member has portions with different outer diameters, it is possible to absorb the thermal stress applied in the vertical direction with the portion and to disperse the stress toward the upper and lower directions from this portion. The outer diameters of the pillared conductive member may have a difference of 0.5 μm or more. Moreover in the case where a coating treatment is performed on the pillared conductive member, the coated portion can produce the same advantageous effect.

Second Embodiment

Figure 13:
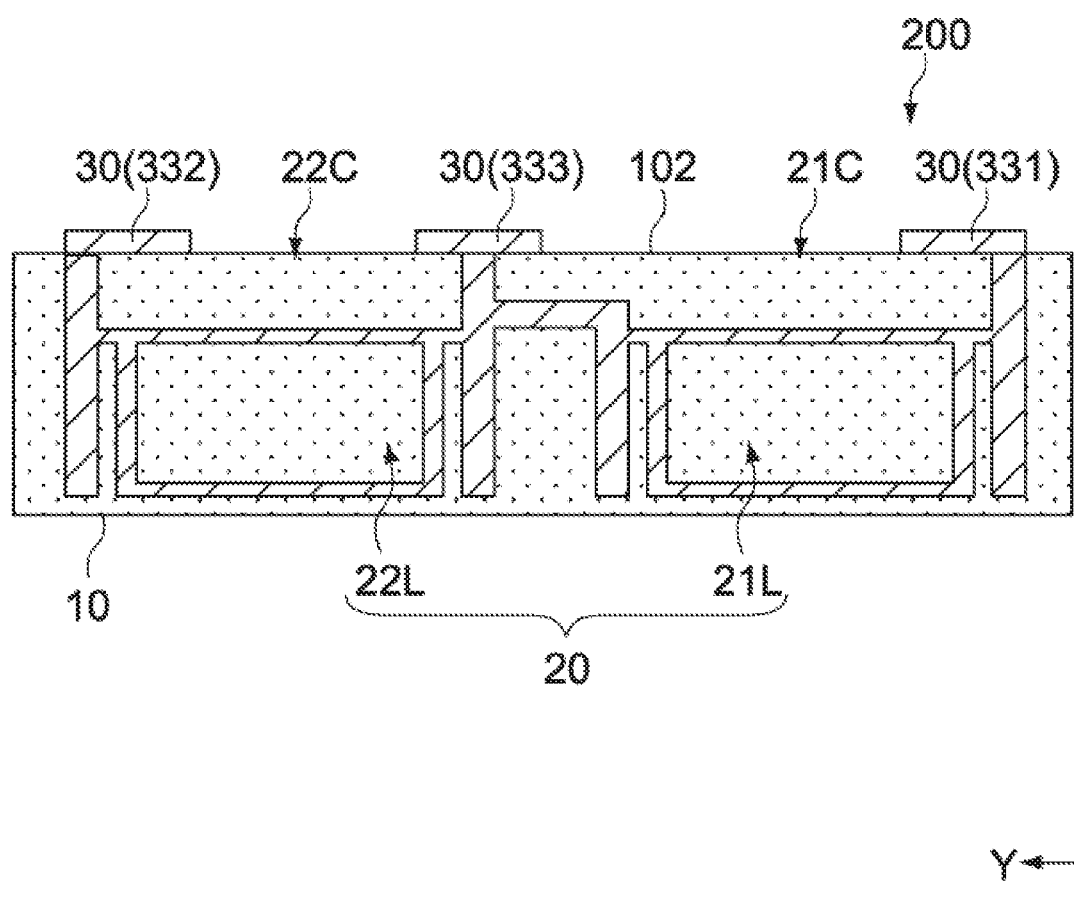
FIG. 13 is a schematic sectional perspective view of an electronic component according to another embodiment of the disclosure.

FIG. 13 is a schematic sectional perspective view of an electronic component according to a second embodiment of the disclosure. For ease of understanding, a region corresponding to the internal conductor is indicated by hatching. Structures different from the first embodiment will be hereinafter mainly described. The same reference numerals are given to the same elements as those of the first embodiment, and the description thereof will be omitted or simplified.

An electronic component 400 in this embodiment may include the insulator 10, the internal conductor 20, and the external electrode 30. Like the first embodiment, the electronic component 200 may include the coil component similarly to the first embodiment but the internal conductor 20 may include two coil portions 21L and 22L, which is different from the first embodiment.

In the electronic component 200 of the this embodiment, the two coil portions 21L, 22L may be provided in the insulator 10 and three external electrodes 331, 332, 333 may be provided on the bottom surface 102 of the insulator 10. The coil portion 21L may be coupled between the external electrodes 331 and 333, and the other coil portion 22L may be coupled between the external electrodes 332 and 333.

The number of the coil portions is not particularly limited to two as illustrated but may be three or more. The number of the external electrodes 30 is also not particularly limited to three as illustrated but may be adequately changed. According to the fourth embodiment, more than one coil component may be integrated into a single component.

Third Embodiment

Figure 14:
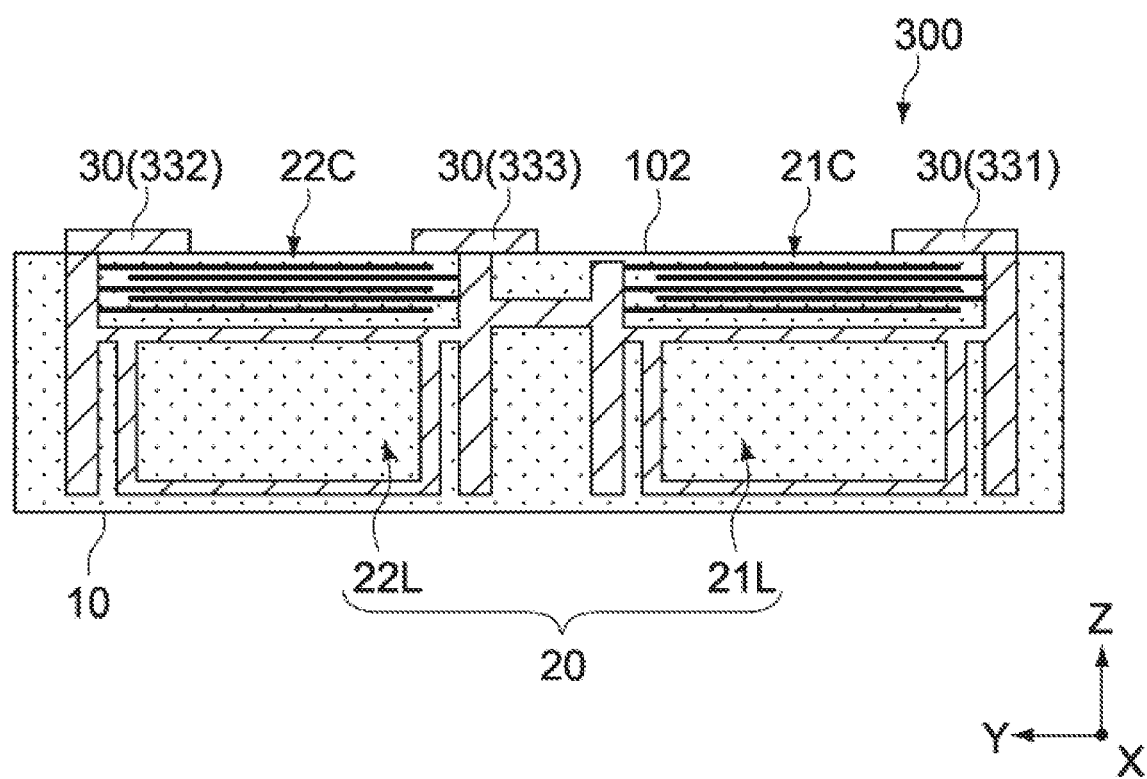
FIG. 14 is a schematic sectional perspective view of an electronic component according to other embodiment of the disclosure.

FIG. 14 is a schematic sectional perspective view of an electronic component according to a third embodiment of the disclosure. For ease of understanding, a region corresponding to the internal conductor is indicated by hatching. Structures different from the second embodiment will be hereinafter mainly described. The same reference numerals are given to the same elements as those of the second embodiment, and the description thereof will be omitted or simplified.

An electronic component 300 in this embodiment may include the insulator 10, the internal conductor 20, and the external electrode 30. The internal conductor 20 may include two coil portions 21L and 22L, which is same as the second embodiment, but the internal conductor 20 may further include two capacitor elements 21C, 22C, which is different from the second embodiment.

The capacitor element 21C may be provided between the coil portion 21L and the bottom surface 102 of the insulator 10, and may be coupled to the external electrodes 331, 333 in parallel with the coil portion 21L. The capacitor element 22C may be provided between the coil portion 22L and the bottom surface 102 of the insulator 10, and may be coupled to the external electrodes 332, 333 in parallel with the coil portion 22L.

Each of the capacitor elements 21C and 22C may include a first internal electrode layer electrically coupled to one ends of the coil portions 21L and 22L and a second internal electrode layer electrically coupled to the other ends of the coil portions 21L and 22L. The second internal electrode layer may face the first internal electrode layer in the Z-axis direction to form capacitors. The capacitor elements 21C, 22C may be disposed between the coil portions 21L, 22L and the external electrodes 331 to 333, thereby forming the LC integrated electronic component 300.

The invention is not limited to the above described embodiments and various modification can be made.

For example, in the embodiments described above, the insulating layers and the via conductive members are alternately layered from the top surface side to the bottom surface side to fabricate the electronic component. Alternatively the insulating layers and the via conductive members may be alternately layered from the bottom surface side to the top surface side.

In the above-described embodiment, all the contacts in the internal conductor are situated at offset positions in the stacking direction with respect to the corresponding bonding surfaces of the insulating layers. However, the invention also encompasses electronic components in which only some of the contacts are disposed at positions offset in the stacking direction with respect to the corresponding bonding surfaces.

Furthermore, in the above embodiments, the coil component and the LC component were described as examples of the electronic component, but it is also possible to use other components such as a capacitor component, a resistive component, a multilayer wiring substrate and the like. The invention is also applicable to other electronic components that include internal conductors and are formed by building up on a layer-by-layer basis in the height direction.

What is claimed is:

1. An electronic component, comprising:
    an insulator made of a material containing resin, the insulator including a first insulating layer that has a first bonding surface perpendicular to one axial direction and a second insulating layer bonded to the first bonding surface;
    an internal conductor forming a coil portion wound around an axis perpendicular to the one axial direction; and
    an external electrode provided on the insulator and electrically coupled to the internal conductor,
    wherein the internal conductor includes a plurality of first conductive members provided in the first insulating layer and a plurality of second conductive members provided in the second insulating layer, each of the first conductive members includes a first contact that is situated at a position offset in the one axial direction with respect to the first bonding surface and connected to the corresponding second conductive member; and
    wherein the first contact intervenes between the first conductive member and the second conductive member.

2. The electronic component of claim 1, wherein
    the insulator further includes a third insulating layer that has a second bonding surface bonded to the second insulating layer, and the internal conductor further includes a plurality of third conductive members provided in the third insulating layer, each of the third conductive members including a second contact that is situated at a position offset in the one axial direction with respect to the second bonding surface and connected to the corresponding second conductive member.

3. The electronic component of claim 2, wherein the internal conductor includes:
a plurality of connecting conductive members provided in the first insulating layer, each of the connecting conductive members coupling predetermined two first conductive members among the plurality of first conductive members;
a plurality of second connecting conductive members provided in the third insulating layer, each of the second connecting conductive members coupling predetermined two third conductive members among the plurality of third conductive members.

4. The electronic component of claim 3, further comprising:
a capacitor element including a first internal electrode layer that is coupled to one end of the coil portion and a second internal electrode layer that is coupled to the other end of the coil portion and faces the first internal electrode layer in the one axial direction, the capacitor element being disposed between the coil portion and the external electrode.

5. The electronic component of claim 1, wherein the first and second conductive members are made of a metallic material containing copper, silver or nickel.

6. The electronic component of claim 3, wherein the plurality of first and second connecting conductive members are made of a metallic material containing copper, silver or nickel.

7. The electronic component of claim 1, wherein the first contact is formed of a metallic material containing titanium or chromium.

8. The electronic component of claim 2, wherein the second contact is formed of a metallic material containing titanium or chromium.

9. The electronic component of claim 1, wherein the insulator contains resin and ceramic particles.

10. The electronic component of claim 1, wherein a width of the first conductive members and a width of the second conductive members are the same in a cross section orthogonal to the first bonding surface.

11. The electronic component of claim 2, wherein a width of the second conductive members and a width of the third conductive members are the same in a cross section orthogonal to the second bonding surface.

12. The electronic component of claim 11, wherein a width of the first conductive members and the width of the second conductive members are the same in a cross section orthogonal to the first bonding surface.

13. An electronic component, comprising:
an insulator made of a material containing resin, the insulator including a first insulating layer that has a first bonding surface perpendicular to one axial direction and a second insulating layer bonded to the bonding surface;
an internal conductor forming a coil portion wound around an axis perpendicular to the one axial direction; and
an external electrode provided on the insulator and electrically coupled to the internal conductor,
wherein the internal conductor includes a plurality of conductive members provided in the first insulating layer, each of the conductive members extending in the one axial direction, and a plurality of connecting conductive members provided in the second insulating layer, each of the connecting conductive members coupling predetermined two conductive members among the plurality of conductive members;
wherein each of the conductive members includes a contact that is situated at a position offset in the one axial direction with respect to the bonding surface and connected to the corresponding connecting conductive member; and
wherein the contact intervenes between the conductive member and the connecting conductive member.

14. A method of manufacturing a coil component, comprising:
forming a first insulating layer on a base plate;
forming a plurality of first conductive members on the first insulating layer;
forming a second insulating layer that covers the first conductive members on the first insulating layer;
polishing the second insulating layer to expose the first conductive members on a surface of the second insulating layer;
etching surfaces of the first conductive members exposed on the second insulating layer;
forming a plurality of second conductive members on the second insulating layer, the plurality of second conductive members being coupled to the plurality of first conductive members;
forming a third insulating layer that covers the second conductive members on the second insulating layer; and
forming an external electrode on the third insulating layer, the external electrode being electrically coupled to the second conductive members.

15. The method of manufacturing a coil component according to claim 14, wherein
forming a plurality of second conductive members includes:
forming a seed layer that covers the surfaces of the first conductive members on the second insulating layer;
forming, on the seed layer, a resist pattern that has openings corresponding to the surfaces of the first conductive members; and
forming the plurality of second conductive members by electroplating using the resist pattern as a mask.

* * * * *